United States Patent [19]

Landoll et al.

[11] Patent Number: 5,082,064
[45] Date of Patent: Jan. 21, 1992

[54] TILLAGE IMPLEMENT HAVING DEPTH ADJUSTABLE DISCS

[75] Inventors: Donald R. Landoll, Marysville; Robert D. Harlan, Hanover; Wayne L. Carroll, Marysville, all of Kans.

[73] Assignee: Landoll Corporation, Marysville, Kans.

[21] Appl. No.: 469,177

[22] Filed: Jan. 24, 1990

[51] Int. Cl.[5] .......................................... A01B 23/00
[52] U.S. Cl. ................................ 172/178; 172/196; 172/382; 172/583; 172/584
[58] Field of Search ............... 172/140, 174, 175, 178, 172/196, 382, 454, 455, 583, 584, 599, 600, 675, 692, 734, 742, 744; 403/388, 390

[56] References Cited

U.S. PATENT DOCUMENTS

| | | | |
|---|---|---|---|
| 1,931,101 | 10/1933 | Beckstrom | 403/388 |
| 2,601,165 | 6/1952 | Moore | 172/584 X |
| 2,781,710 | 2/1957 | Padrick | 172/744 X |
| 3,757,871 | 9/1973 | Maust, Jr. et al. | 172/178 |
| 4,033,417 | 7/1977 | Rau et al. | 403/390 X |
| 4,313,503 | 2/1982 | Good et al. | 172/140 |
| 4,446,924 | 5/1984 | Dietrich, Sr. | 172/140 |
| 4,492,272 | 1/1985 | Jensen | 172/178 |
| 4,625,809 | 12/1986 | Moynihan | 172/178 |

FOREIGN PATENT DOCUMENTS 10791  3/1956  Fed. Rep. of Germany .
2023382  1/1980  United Kingdom ............... 172/178

OTHER PUBLICATIONS

Single Section/Flexible Trash Mulcher Models 4210 and 4230 brochure by Sunflower, received 10/1983.
Colter-Champ II Chisel Plow brochure by DMI, received Oct. 1983.
Turbo-Champ brochure by DMI, received 10/1983.
Model 1710A Mulch Tiller brochure by John Deere, received Jan. 1982.
Tillagesaver Diskchisel brochure by Kewanee, received Jan. 1985.
Trashmulcher Model 4211 Brochure by Sunflower received Jan. 1985.
Weatherproofer Model 2200 brochure by Landoll, received Sep. 1989.
Brochure, Landoll Soil-Master (SM-680).
Brochure, Sunflower Model 4310 Disc-Ripper (BAC 9401/2/89).
Brochure, White Farm Equipment, The 435 Conservation Chisel Plow (Form No. S274).

Primary Examiner—David H. Corbin
Assistant Examiner—Jeffrey L. Thompson
Attorney, Agent, or Firm—Hovey Williams Timmons & Collins

[57] ABSTRACT

A tillage implement which has both deep tillage subsoil shanks at the rear of the machine and relatively shallow running, residue cutting and topsoil mixing discs at the front of the machine provides for expeditious depth adjustment of the discs through spacer blocks that may be inserted between the underside of the frame of the implement and the tops of the gang beams. The blocks are designed to be clamped in position beside pivot bolts and angle retaining bolts of the gangs such that the blocks may be inserted or removed by merely loosening the bolts instead of completely removing the same and without interfering with the ability of the gangs to be angle adjusted fore-and-aft. The configuration of the blocks is such that they may be stacked one upon the other to provide an increased range of depth adjustment without sacrificing rigidity of construction.

18 Claims, 4 Drawing Sheets

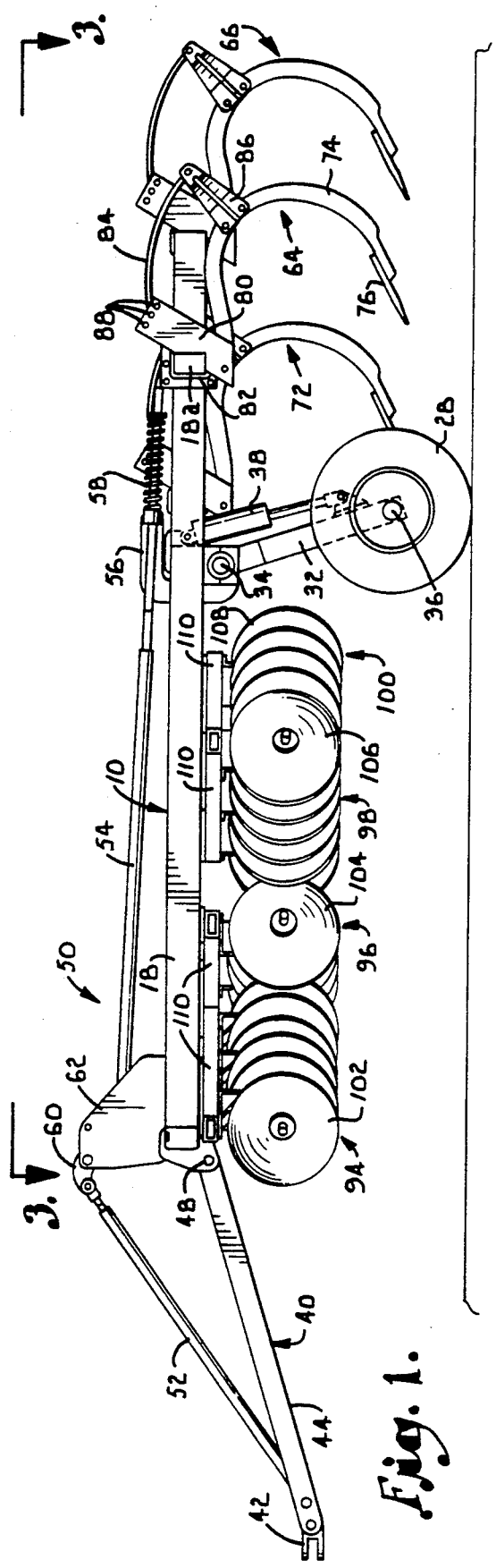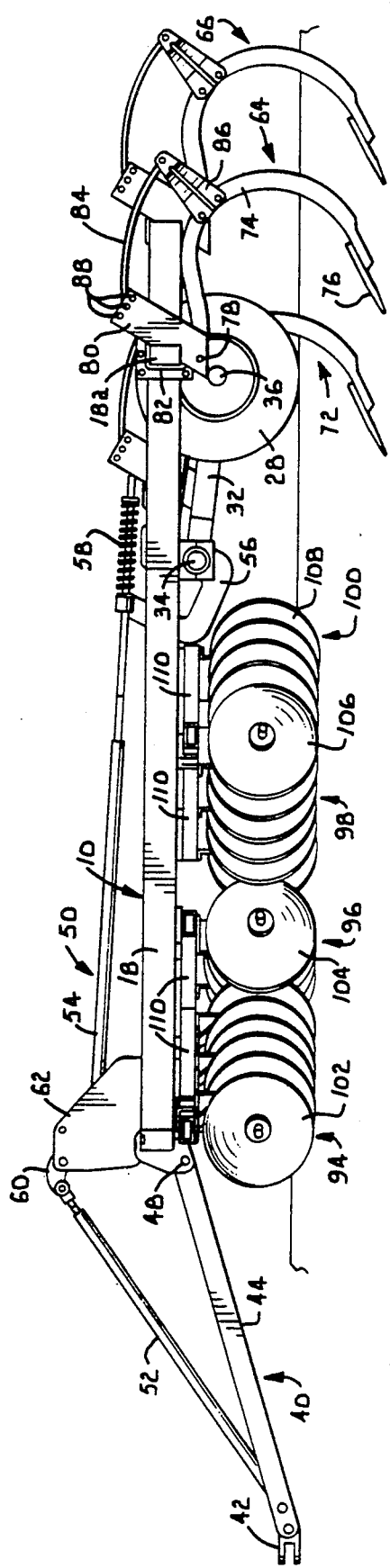

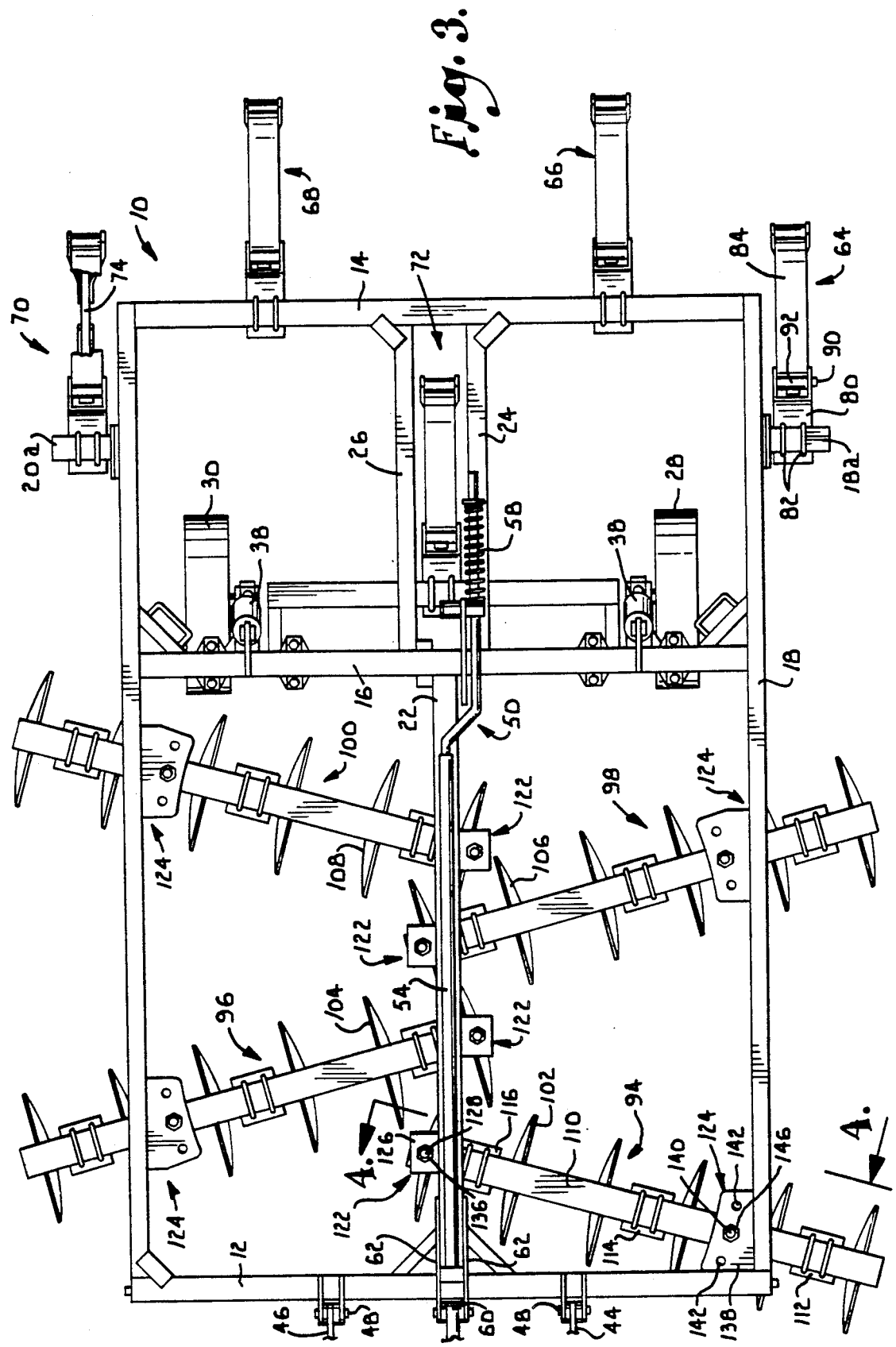

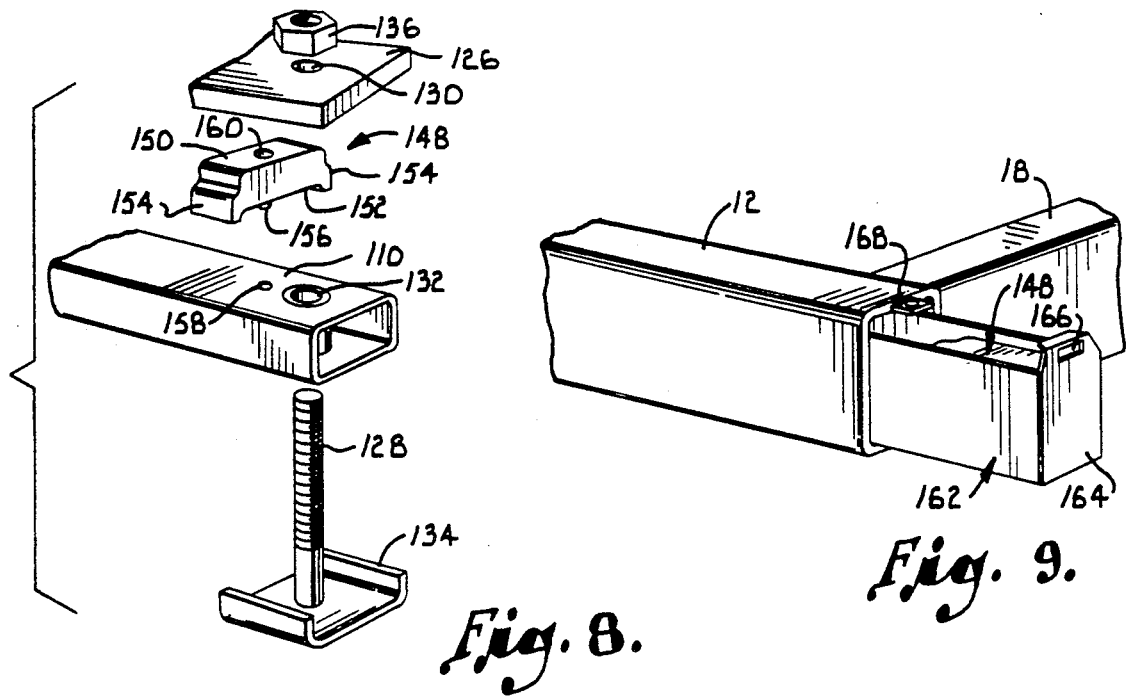
Fig. 8.
Fig. 9.
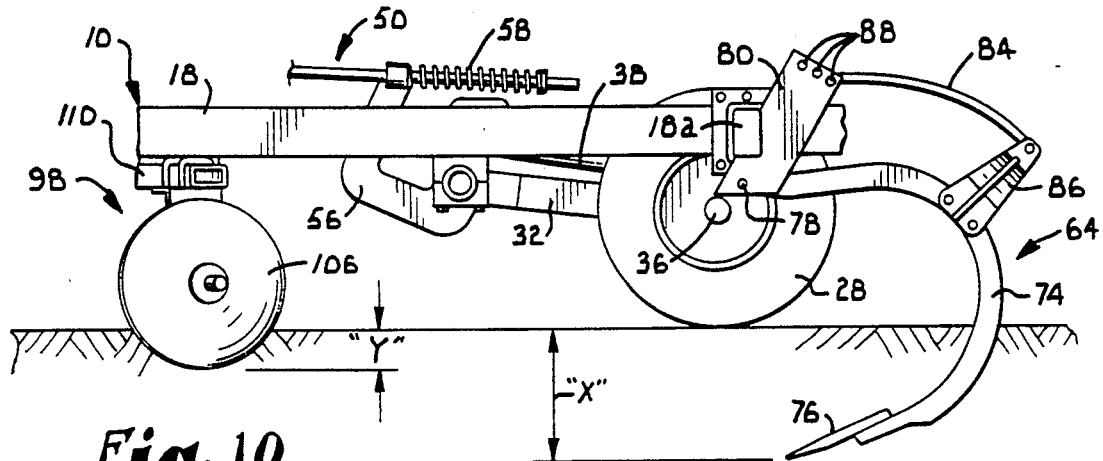
Fig. 10.
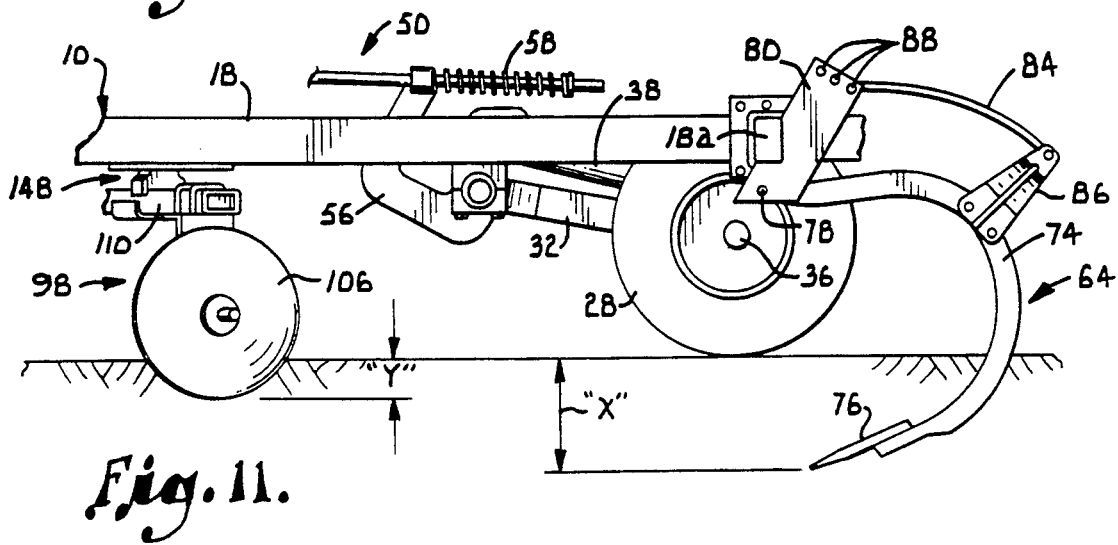
Fig. 11.

TILLAGE IMPLEMENT HAVING DEPTH ADJUSTABLE DISCS

TECHNICAL FIELD

This invention relates generally to tillage implements and, more particularly, to tillage implements of the type having a combination of discs for trash severance, shallow mixing and soil aeration and deep tillage shanks for cutting deep passageways into the subsoil to enhance root growth and promote water penetration.

BACKGROUND

So called conservation compliance tillage implements which contain both disc gangs and deep tillage shanks are presently commercially available. Generally speaking, the discs, which are positioned ahead of the shanks, are arranged in oblique gangs at a relatively shallow depth for trash severance and topsoil tilling while the shanks are disposed for deep penetration into the subsoil to remove lower compaction zones and provide subsoiling slots that encourage the entry and penetration of moisture. The discs, which are concavo-convex, slice through the crop residue on the surface of the field while turning the topsoil and mixing the severed residue down below ground level to speed up decomposition for enrichment of the soil while leaving a portion of the residue above ground to reduce wind and water erosion. Since the discs are arranged in gangs which extend at oblique angles with respect to the path of travel of the machine, they throw soil inwardly or outwardly depending upon their orientation, which contributes to residue coverage. Ideally, the angle of attack of the disc gangs can be adjusted to increase or decrease the amount of soil which is thrown by the discs, thereby adjusting the amount of residue coverage which is achieved.

Desirably, in some models the pairs of disc gangs are arranged in tandem, with one oppositely outwardly extending pair of gangs disposed in leading relationship to the other. The gangs of the forward pair normally converge rearwardly as the centerline of the machine is approached to present a general V-shape when the implement is viewed in plan, while the gangs of the trailing pair converge forwardly as the center of the machine is approached to present an inverted V-formation when the machine is viewed in plan. The discs of the forward pair of gangs are disposed to throw the soil outwardly in opposite directions from the center of the machine, while the discs of the rear pair are disposed to throw it back inwardly.

It is desirable to be able to change the depth of the shanks relative to the depth of the discs, and vice versa, to accommodate different soil conditions and personal preferences. However, prior adjustment arrangements have not been satisfactory in this respect.

For example, a disc-ripper commercialized by Sunflower Manufacturing Company, Inc., of Beloit, Kansas, and illustrated in a brochure identified as BAC 9401/2/89, employs hydraulic mechanism for raising and lowering a set of ripper shanks at the rear of the machine, which mechanism necessarily involves considerable expense and complexity. Although the disc gangs can apparently be angle-adjusted in a fore-and-aft sense, there is no means provided for varying the depth of the gangs relative to the frame itself.

Similarly, a Model 435 Conservation Chisel Plow of White Farm Equipment disclosed in a sales brochure 15M82 Form No. S274 utilizes a hydraulic system for depth adjustment. In that machine, a series of discs are mounted on a tool bar across the front of the machine which bar is raisable and lowerable by a hydraulic piston and cylinder assembly. In this unit the discs, while individually disposed at oblique angles relative to the path of travel of the machine, are not mounted on beams which are themselves disposed obliquely with respect to the path of travel of the machine. Thus, this arrangement lacks the advantages of angularly arranged disc gangs, as well as tandemly arranged gangs, and provides no means for angle adjustment.

SUMMARY OF THE INVENTION

Accordingly, one important object of the present invention is to provide a tillage implement having both disc gangs and deep working shanks for the advantages those two types of tools provide in a single implement, yet which permits the depth of penetration of the disc gangs to be readily adjusted relative to the shanks and the main frame of the implement without sacrificing the ability to adjust the disc gangs angularly as well.

In furtherance of this objective, the present invention contemplates the use of special spacer blocks that can be inserted between the beams of the disc gangs and the overhead supporting frame of the implement at strategic locations after mounting means between the disc gangs and the frame have been loosened so that the blocks, when installed, are clamped in the adjusted spacing between the support beams of the discs and the overhead frame, resulting in a rigid construction notwithstanding the depth-adjusted condition of the implement. Each block is specially configured to partially embrace the underlying gang beam when installed so as to prevent dislocation of each block in a lateral sense from its beam during field operations, and each block further has a locating stud projecting downwardly from the bottom thereof which is inserted into a mating receiving hole on the disc beam to confine the block longitudinally of the beam. All the blocks are identically shaped and are provided with holes in their uppermost surfaces such that the blocks may be stacked in levels of two or more so as to provide additional downward spacing of the discs from the main frame of the implement if desired. The depth adjustment blocks are adapted to be strategically positioned alongside of pivot bolts and angle retaining bolts of the disc support beams rather than in direct vertical alignment with such bolts themselves so as to permit insertion and removal of the blocks by merely loosening and tightening the bolts, without complete removal of such bolts and replacement thereof.

BRIEF DESCRIPTION OF THE DRAWINGS

FIG. 1 is a side elevational view of a tillage implement constructed in accordance with the principles of the present invention showing the frame elevated into a roading position thereof with the discs and deep tillage shanks completely raised out of the ground;

FIG. 2 is a similar side elevational view of the implement of FIG. 1 but showing the latter lowered into a working position with the discs penetrating the topsoil and the tillage shanks extending substantially further below ground level into subsoil working positions;

FIG. 3 is a fragmentary top, plan view of the implement taken substantially along sight line 3—3 of FIG. 1, the hitch mechanism at the forward end of the implement being broken away;

FIG. 8 is an exploded perspective view of a typical pivot bolt found at the inboard end of each of the disc gangs of the implement illustrating the relationship of components when a spacer block is inserted between the beam of the gang and the overhead plate of the implement frame;

FIG. 9 is a fragmentary perspective view of the left front corner of the implement frame looking rearwardly and illustrating a pullout storage drawer built into the adjacent frame member of the implement for easy storage and retrieval of the spacer blocks for depth adjustment of the disc gangs;

FIG. 10 is a fragmentary side elevational view of the implement in one working position thereof illustrating the discs in a topsoil working position and while the trailing deep tillage shanks are disposed at a deeper subsoil working position; and FIG. 11 is a fragmentary side elevational view similar to FIG. 10 but illustrating the need for and means of adjusting the depth of the discs relative to the implement frame when the frame itself is elevated to place the tillage shanks in a more shallow operating depth than that illustrated in FIG. 10, for example.

DETAILED DESCRIPTION

Figure 4:
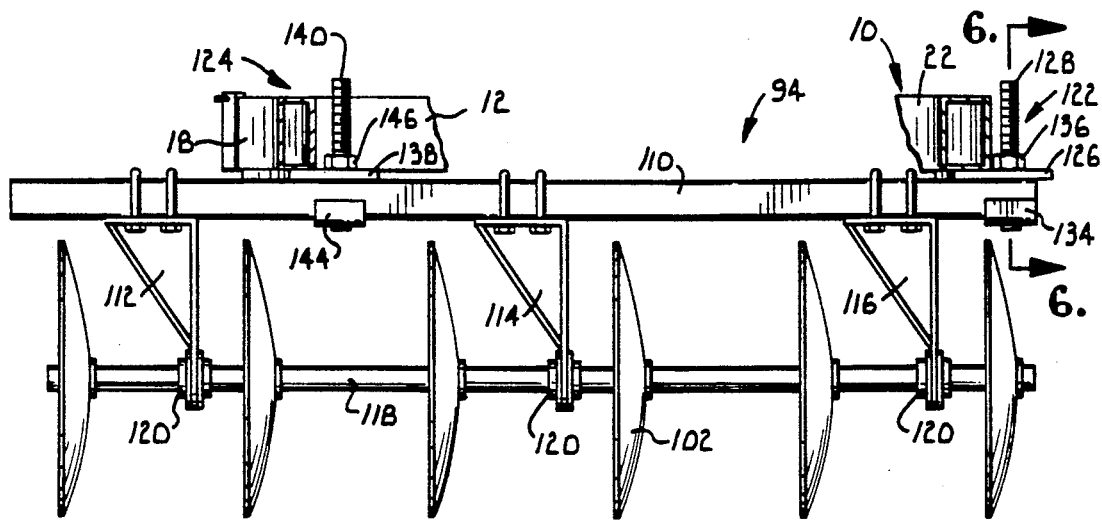
FIG. 4 is an enlarged rear elevational view of one of the disc gangs of the implement taken substantially along line 4—4 of FIG. 3 and showing the left front disc gang in what might be termed an unadjusted position without insertion of a spacer block.

The implement of the present invention includes a main frame 10 of open box-like construction and of rectangular design when viewed in plan, as shown in FIG. 3. The normally horizontally disposed, flat frame 10 includes a front cross member 12, a rearmost cross member 14, an intermediate cross member 16, and a pair of left and right, fore-and-aft extending side members 18 and 20 respectively that interconnect the cross members 12, 14, and 16 to provide a rigid overall effect for the frame 10. A central frame member 22 extends fore-and-aft, interconnecting the front member 12 and the intermediate member 16, and a pair of laterally spaced, fore-and-aft extending members 24 and 26 are rigidly connected between the intermediate member 16 and the rearmost member 14. Central member 22 and members 24, 26 thereby also form part of the frame 10.

A pair of left and right ground wheels 28 and 30 respectively are located within the perimeter of the frame 10 and are disposed to support the latter for travel over the ground. Each wheel 28,30 is coupled with the frame 10 through its own arm 32 having a pivotal connection 34 at its upper end with the frame 10 and a pivotal connection 36 at its lower end with the respective wheel 28 or 30. Each arm 32 has its own hydraulic piston and cylinder assembly 38 that is pivotally connected between the arm 32 adjacent its lower end and the intermediate cross member 16 of the frame 10. Thus, extension and retraction of the hydraulic cylinder assemblies 38 causes the two ground wheels 28,30 to be retracted or extended with respect to the frame 10 whereby to lower and raise the implement as may be seen by comparing FIGS. 1 and 2, for example.

A tongue 40 is provided at the forward end of the frame 10 for adapting the implement to be hitched with a towing vehicle. The front end of the tongue 40 has a clevis 42 by which attachment is made to the towing vehicle (not shown). Tongue 40 is generally V-shaped when viewed in top plan with a pair of opposite side pieces 44,46 diverging rearwardly from the clevis 42 and having respective horizontal pivot connections 48 with the front cross member 12 of the frame 10. Thus, the tongue 40 and the frame 10 can buckle relative to one another about the horizontal axis defined by the aligned pivots 48, which is important in maintaining the frame 10 in a level condition as rises and falls in the terrain are encountered by ground wheels 28,30 relative to the hitch point at the clevis 42.

In order to render the frame 10 self-leveling throughout operation, a leveling mechanism broadly denoted by the numeral 50 is provided. Mechanism 50 consists primarily of linkage which is connected between the tongue 40 and the frame 10 in such a way that upward or downward movement of the frame 10 relative to the hitch point 42 as rises and falls in the ground contour are experienced causes a reaction in the linkage mechanism 50 that increases or decreases the angle between the tongue 40 and the frame 10 as may be necessary to maintain a level condition of the latter. The mechanism 50 is not directly related to the present invention; therefore, suffice it to point out that mechanism 50 generally includes a forward link 52 connected to the tongue 40 adjacent to the front end of the latter, a rear link 54 connected to the frame 10 via a generally J-shaped, pivotal arm 56 and yieldable connection 58, and a motion transmitting-coupling 60 between the links 52,54 within a pair of laterally spaced, upstanding plates 62 at the intersection of front cross member 12 and central frame member 22.

Attached to the frame 10 for deep tillage are five deep tillage shank assemblies 64,66,68,70 and 72. As viewed in plan in FIG. 3, it will be seen that the shank assembly 64 is located at the left rear of the frame 10, outboard of the latter and wheel 28 on a stub frame extension 18a, the shank assembly 66 is mounted on the rearmost frame member 14 slightly inboard of the left ground wheel 28, the shank assembly 68 is likewise mounted on the rearmost frame member 14 slightly inboard of the ground wheel 30, the shank assembly 70 is mounted on a stub frame extension 20a projecting outwardly from side member 20 adjacent the rear of frame 10 and slightly outboard of the wheel 30, and the shank assembly 72 is located centrally of the machine between the two short, fore-and-aft extending frame members 24,26 and slightly behind the ground wheels 28,30. All of the shank assemblies 64,66,68,70, and 72 are of identical construction and, therefore, only the construction of one of such assemblies, i.e., assembly 64, will be described in detail.

Shank assembly 64 includes as its primary component a generally reversely C-shaped shank 74 having a lowermost penetrating point 76 secured thereto and extending at an angle downwardly and forwardly therefrom. The upper, forwardmost end of the shank 74 has a horizontal pivot connection 78 with the lower end of a suitable mounting bracket 80 rigidly attached to the stub extension member 18a by a pair of U-bolts 82. The shank 74 is yieldably resisted in its upward movement by a leaf spring unit 84 of known design that is pivotally connected between the upper end of the bracket 80 and the upper end of an upstanding post 86 on the shank 74.

The depth of penetration of the shanks 74 into the ground may be controlled by the wheel cylinders 38 which raise and lower the frame 10 relative to ground level. Additionally, the depth of the shanks 74 can be adjusted slightly by changing the location of the pivot connection between the front end of the leaf spring unit 84 and the bracket 80. In this respect, it will be appreciated that each of the formed metal brackets 80 has a series of three sets of aligned holes 88 that can be alternatively selected for attaching the corresponding leaf spring unit 84 to the bracket 80. A cross bolt 90, as shown in FIG. 3, serves as the pivot for the proximal end of the spring unit 84 and spans the holes of the selected set while passing through an eyelet 92 in the proximal end of the spring unit 84. Removal of the bolt from one of the holes 88 and reinsertion into another thus has the effect of changing the distance between the upper end of the bracket 80 and the post 86, consequently raising or lowering the shank 74 some distance to position the point 76 either closer to or farther from the frame 10 as the case may be.

While deep tillage is provided by the shank assemblies 64-72, severance of crop residue and mixing of that residue with the topsoil while turning and tilling that shallow layer of soil is accomplished by gangs of tandem discs situated on the front half of the frame 10. Viewing FIG. 3, it will be seen that four separate gangs 94, 96, 98, and 100 are provided on the frame 10. Gangs 94 and 96 are the lead gangs, disposed in tandem with rear gangs 98 and 100. The lead gangs 94, 96 project outwardly in opposite directions from the centerline of the frame 10 and converge rearwardly toward such centerline, the right lead gang 96 being offset slightly to the rear of the left lead gang 94. On the other hand, the rear gangs 98, 100, while likewise projecting outwardly in opposite directions from the centerline of the frame 10, diverge rearwardly from such centerline so as to be angled outwardly and rearwardly. The right rear gang 100 is offset slightly to the rear of the left rear gang 98.

All of the discs of the gangs 94, 96, 98, and 100 are concavo-convex. Although all of the discs of such gangs are arranged with their concave faces leading at an oblique angle with respect to the direction of travel of the machine, the discs 102 of the left front gang 94 are disposed to throw the dirt outwardly and leftwardly during operation, while the discs 104 of the right front gang 96 are disposed to throw the soil outwardly and rightwardly. On the other hand, the discs 106 of the left rear gang 98 are disposed to throw the soil inwardly and rightwardly, while the discs 108 of the right rear gang 100 are disposed to throw the soil inwardly and leftwardly.

Although the discs of each of the various gangs are disposed at a different angle than the discs of other gangs, all of the gangs 94, 96, 98, and 100 are otherwise of identical construction. Therefore, the left front disc gang 94 will be used as an example of the construction of all gangs.

Gang 94 includes a beam 110 situated beneath the frame 10 and having such a length that it extends for a short distance outwardly beyond the left front corner of the frame 10 and slightly inwardly beyond the center member 22 at the opposite extreme. A series of three hangers 112, 114, and 116 (see, in particular, FIG. 4) are spaced along the beam 110 and project downwardly therefrom for suspending a long shaft 118 beneath the beam 10 in vertical registration therewith. The shaft 118 stops slightly inboard of the opposite ends of the beam 110. Bearings 120 at the lowermost ends of each of the hangers 112, 114, and 116 journal the shaft 118 for rotation about its longitudinal axis. The discs 102 are secured to the shaft 118 at spaced intervals along the latter for rotation therewith.

The gangs 94, 96, 98, and 100 are all attached to the frame 10 in the same manner. Therefore, once again, the manner of attachment for the left front gang 94 will be explained in detail and will serve as an example of the mounting arrangement for the other gangs. In this respect it will be noted that the gang 94 is attached to the frame 10 in a way that not only permits fore-and-aft angle adjustment, but also up and down depth adjustment. The inner end of the gang 94 is attached to the frame 10 through pivot means broadly denoted by the numeral 122, while the laterally outer portion of the gang 94 is attached to frame 10 via structure which is broadly described as retainer means 124 that is adapted to hold the gang 94 in a selected position of angular adjustment about the pivot means 122.

Dealing first with the pivot means 122, the fore-and-aft central frame member 22 has a rigid plate 126 projecting horizontally outwardly from the centerline of the frame 10 into the right front quadrant thereof so as to be positioned generally to one side of the member 22. The plate 126 is affixed to the bottom of the member 22.

Figure 6:
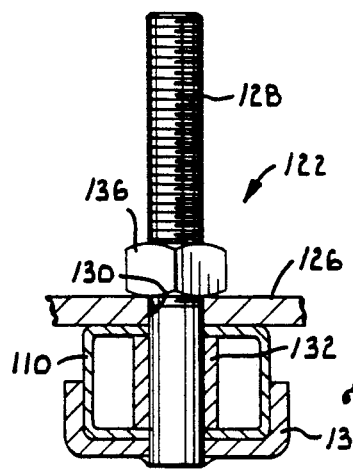
FIG. 6 is an enlarged, fragmentary, vertical cross-sectional view of the pivot bolt and associated structure adjacent the inboard end of the left front disc gang taken along line 6—6 of FIG. 4 and illustrating details of construction.

As illustrated perhaps most clearly in FIGS. 4 and 6, the pivot means 122 includes an upright bolt 128 passing through a bore 130 and a collar 132 within the beam 110. The lower end of the bolt 128 projects downwardly beyond the beam 110 and has an abutment in the form of a transversely U-shaped cup 134 rigidly affixed thereto. The cup 134 matingly receives the bottom half of the beam 110 in the vicinity of the bolt 128. The upper end portion of the bolt 128 is threaded and receives a nut 136 which may be tightened or loosened to draw the cup 134 up toward the plate 126 or lowered away therefrom. The fit between the bore 130 and the bolt 128 is such as to permit the bolt 128 to pivot within bore 130 during angle adjustment of the gang 94 which, as will be seen, requires only a slight amount of rotational movement.

Figure 7:
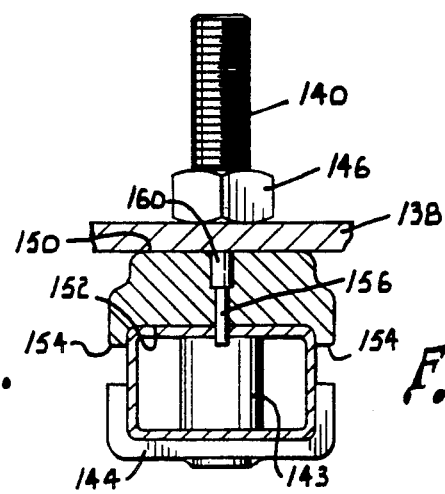
FIG. 7 is a fragmentary vertical, cross-sectional view of the angle retaining bolt of the left front disc gang taken along line 7—7 of FIG. 5 and showing the condition of things when the depth of the disc gang has been adjusted downwardly relative to the frame and a spacer block has been inserted.

The retainer means 124 is structurally similar in most respects to the pivot means 122. In this regard, it will be seen that the frame 10 in its left front corner is provided with a plate 138 disposed in a horizontal orientation at the same level as the plate 126 of the pivot means 122. The plate 138 is rigidly affixed to the adjacent bottom surfaces of the front member 12 and the side member 18 and projects generally inwardly therefrom into the left front quadrant of the frame 10. A bolt 140 forming a part of the retaining means 124 projects through a selected one of three holes 142 in the plate 138 (only two of such holes being visible) and through the beam 110. As with the bolt 128 of pivot means 122, an upright collar 143 (as shown in FIG. 7) is located within the beam 110 to receive the bolt 140. The three holes 142 are disposed on an arc that is concentric with the upright pivot axis defined by the pivot bolt 128.

The retaining bolt 140 is provided at its lower end with an abutment in the nature of a cup 144 of identical construction to the cup 134 of pivot means 122, which complementally receives the lower portion of the beam 110. The upper end of the bolt 140 is threaded for receiving a nut 146 that either draws the bolt 140 upwardly or extends it downwardly relative the plate 138 depending on the direction of rotation of the nut 146.

As will be appreciated, the beam 110 of the gang 94 may be clamped tightly up against the bottom of the plates 126 and 138 by appropriate directional rotation of the nuts 136 and 146. In such a condition the gang 94 is ready for operation with the discs 102 at a corresponding depth setting relative to the frame 10. This provides a sturdy, rigid and secure connection between the gang 94 and the frame 10.

Figure 5:
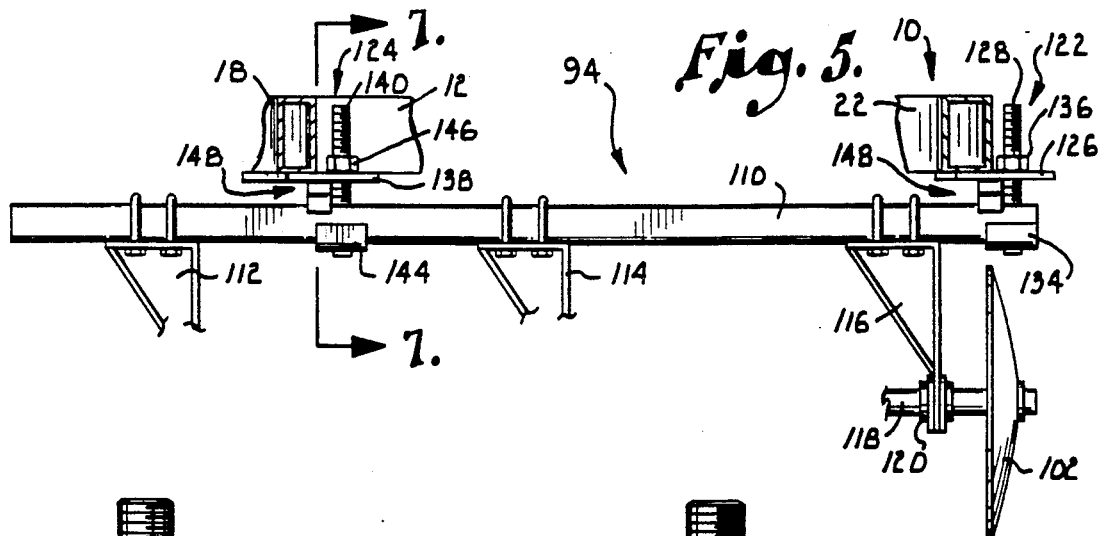
FIG. 5 is a fragmentary rear elevational view of the left front disc gang of the implement similar to FIG. 4 but showing the disc gang in an adjusted, lowered position relative to the overhead frame by virtue of the insertion of a pair of adjustment blocks.

The depth adjustment means for the gangs 94,96,98, and 100 rely in part upon the components which make up the pivot means 122 and the angle retainer means 124. Such depth adjustment means include a plurality of spacer blocks, a minimum of eight, which may be selectively inserted into positions between the beams 110 of the gangs and the overhead frame 10. For example, in FIG. 5 it will be seen that a pair of spacer blocks 148 in accordance with the present invention have been inserted between the overlying plates 126,138 and the beam 110 to position the beam 110 at a slightly lower position relative to the frame 10 than is the case in FIG. 4.

As perhaps shown best in FIGS. 7 and 8, each of the blocks 148 has a flat upper surface 150 designed to abut flatly against the underside of the corresponding plate 126 or 138. It also has a bottom surface 152 disposed to abut flatly against the top surface of the underlying beam 110. A pair of ears 154 project downwardly from the bottom surface 152 at opposite ends of each block 148 so as to overlap and embrace the top of the beam 110 when the block 148 is in place. The tops of the blocks 148 are shaped complementally of the recesses in the bottoms of each block 148 defined by the surface 152 and the ears 154 so that the blocks 148 may be stacked on top of one another for additional depth adjustment and to facilitate storage, as will hereinafter be explained in more detail.

Each block 148 also includes a centrally disposed stud 156 projecting downwardly from the bottom surface 152 for mating reception within a locating hole 158 adjacent the pivot bolt 128 on the one hand and the retaining bolt 140 on the other hand.

The ears 154 and the stud 156 thus served to keep the block 148 properly located on the beam 110 and contribute to a rigid, sturdy connection of the gangs to the frame 10 even when the gangs are in a depth adjusted position through the presence of the blocks 148. It is also to be noted that each of the blocks 148 includes a hole 160 in its top portion which is adapted to matingly receive the stud 156 of another of the blocks when such blocks are stacked one on top of the other for additional depth adjustment or are stored.

As shown in FIG. 9, a convenient means of storing the spacer blocks 148 is to provide a pull-out drawer 162 that is normally retracted into a selected one of the frame members. In the illustrated embodiment, the drawer 162 is housed within the front cross member 12 of the frame. The end plate 164 of the drawer 162 is provided with an opening 166 adjacent its upper end which is disposed to receive a horizontally projecting tang 168 when the drawer 162 is fully telescoped into the cross member 12. A lock or bolt (not shown) may be inserted through the tang with the drawer fully closed so as to releasably secure the door in its closed position.

OPERATION

It will be understood that the implement may be raised and lowered between two extreme positions shown generally in FIGS. 1 and 2, the position of FIG. 1 being an over-the-road position and the position of FIG. 2 being a working position. Of course, extension and retraction of the piston and cylinder assemblies 38 causes raising and lowering of the implement.

In general, the arrangement of components is such that the shank assemblies 64,66,68,70, and 72 work the deep subsoil as the machine is pulled along, and the disc gangs 94,96,98, and 100 work the relatively shallow topsoil while cutting trash such as corn stalks and wheat stubble and mixing such residue into the topsoil to promote decomposition. As illustrated in FIG. 10, the points 76 of the shank assemblies run at a depth "x" while the disc blades 102,104,106, and 108 run at a depth "y".

However, the farmer may decide to change the depth of running of the shank points 76 for any number of reasons including, for example, change in depth of the hard pan or compaction zone or personal preference under the conditions at hand. Thus, he may elect to run the points 76 at a slightly shallower depth than that in FIG. 10, such shallower depth being illustrated by the designation $x^1$ in FIG. 11. This can be accomplished by simply extending the hydraulic cylinders 38 by the appropriate distance and maintaining them at that particular amount of extension. However, raising of the frame 10 through the cylinders 38 causes the depth of penetration of the discs 102-108 to likewise be decreased, which may not be desirable. The farmer may prefer to operate the discs 102-108 at the same depth "y" even though he has selected to run the tillage points 76 at a different depth than that illustrated in FIG. 10.

Accordingly, the farmer needs to lower the gangs 94-100 relative to the frame 10 by the same amount that he has raised the frame 10. To accomplish this, the farmer merely raises the frame 10 hydraulically to a height where the bottom of the discs are raised a distance above the ground. By then applying an appropriate wrench or similar tool to the nuts 136 and 146 and rotating them in a loosening direction, the bolts 128 and 140 will gradually be lowered down through their respective plates 126 and 138 by the weight of the gangs until a space appears between the descending beam 110 and the overhead plates 126 and 138. With the beam 110 thusly lowered, a pair of the blocks 148 are inserted immediately below the plates 126 and 138, taking care to insert the studs 156 of the blocks 148 in their receiving holes 158 and to properly embrace the top portions of the beam 110 with the depending legs 154 of the blocks 148. Thereupon, rotation of the nuts 136 and 146 in a tightening direction draws the beam 110 upwardly, causing the installed blocks 148 to be tightly clamped between the upper surface of the beam 110 and the overhead plates 126 and 138. The number of blocks stacked one upon the other depends, of course, upon the amount of depth adjustment which is needed. Of course, the necessary number of blocks 148 are inserted for all of the gangs 94-100 so that all of the discs always run at the same depth.

It will be noted that use of the depth adjustment blocks 148 does not interfere with the ability of the gangs 94-100 to be angle adjusted in a fore-and-aft direction. Nor does it prevent the discs from being mounted with their axes of rotation coincident with one another to form a common axis of rotation disposed at an oblique angle relative to the direction of travel of the machine. It is also compatible with having the discs arranged in tandem so that the leading discs of the machine can throw the soil outwardly while the trailing discs throw it inwardly and are disposed in laterally overlapped relationship to prevent the formation of ridges.

Note that if angle adjustment is desired, it is only necessary to loosen and remove the four angle retaining bolts 140 of the gangs, whereupon the gangs may be pivoted forwardly or rearwardly to the extent necessary to match the selected angle of attack. With the internal collar 143 of the beam 110 aligned with the selected angle hole 142, the angle retaining bolt 140 may be simply reinstalled and resecured in place.

It is to be noted that during the depth adjustment of the discs, it is not necessary to loosen and remove the pivot bolts 128 and the angle retaining bolts 146 since the spacer blocks 148 are designed to be positioned alongside of such bolts when installed, rather than in direct registration with the bolts, in which case the bolts would extend through the blocks. Thus, either increasing or decreasing the depth of the discs is a relatively simple and quick procedure.

It will be appreciated that the foregoing sets forth one illustrated embodiment of the present invention and that modifications of the invention could obviously be made by those skilled in the art without departing from the gist of the invention. Therefore, the scope of the present invention is not to be limited by the specific embodiment illustrated for purposes of example, but should instead be limited only by the fair scope of the claims which follow

We claim:

1. A tillage implement comprising:

a frame;

ground wheels adjustably coupled with the frame in a manner to permit selective raising and lowering of the frame between working and transport positions;

hitch means coupling with the frame at the normally front end of the latter for connecting the implement to a towing vehicle to permit advancement of the implement;

a plurality of deep tillage shanks secured to the frame adjacent the rear of the latter for penetrating the soil at a depth substantially below ground level when the frame is in its working position and the implement is being advanced, the depth of said shanks below ground level being varied by adjusting the working position of the frame with the ground wheels;

at least a pair of gangs of coaxially aligned, concavo-convex discs mounted on the frame forwardly of the shanks for cutting through crop residue on the surface of the ground and mixing the residue into the topsoil to a depth substantially less than the depth of the shanks when the frame is in its working position and the implement is being advanced, each of said gangs including an elongated mounting beam from which the discs of the gang are suspended with their common axis of rotation extending parallel to the longitudinal axis of the beam, said beams projecting obliquely outwardly from opposite sides of the central, fore-and-aft axis of the frame to face the concave surfaces of the discs forwardly at oblique angles with respect to the direction of travel of the implement;

angle adjustment means attaching the beams of said pair of gangs to the frame in a manner to permit selective adjustment of the oblique, angular relationship between the gangs and the fore-and-aft axis of the frame; and depth adjustment means operably associated with said gangs for permitting selective depth adjustment of the discs relative to the frame and the shanks of the implement, said angle adjustment means for each gang including an upright pivot between an inner end of the respective beam and the frame, permitting the gang to swing in a fore-and-aft direction during such angle adjustment, said angle adjustment means for each gang further including retainer means between the respective beam and the frame at a location laterally outboard of the pivot for releasably holding the gang in a selected angular position, said retainer means and said pivot for each beam being adjustable for selective positioning of the beam at a selectively variable, spaced distance below the frame, said depth adjustment means including rigid spacer structure positionable within the space between the beams and the frame for maintaining the selected adjusted position of the beams below the frame during tillage operations.

2. A tillage implement as claimed in claim 1, said spacer structure for each beam including a pair of selectively insertable and removable blocks, one of said blocks being disposed for insertion between the beam and the frame adjacent the pivot for the beam and the other of said blocks being disposed for insertion between the beam and the frame adjacent the retainer means for the beam.

3. A tillage implement as claimed in claim 2, each of said blocks having a top adapted for abutting engagement with the frame and a bottom adapted for abutting engagement with the beam, said bottom of each block including a flat, recessed surface corresponding in width to the width of the beam and a pair of downwardly projecting ears at opposite extremities of said surface in disposition for causing the bottom of the block to nestingly receive the top portion of the beam when the block is placed thereon.

4. A tillage implement as claimed in claim 3, each of said blocks having a locating stud projecting downwardly from said recessed surface, each of said beams having holes in the top portions thereof adjacent said pivot and the retainer means for receiving the studs of the respective spacer blocks.

5. A tillage implement as claimed in claim 4, there being at least two pairs of said blocks for each gang, all of said blocks having their tops configured complementally to their bottoms whereby to permit the blocks to be selectively matingly stacked on top of one another for adjusting the spaced distance between the beams of the gangs and the frame, the top of each block having an opening for receiving the stud of a block matingly stacked thereon.

6. A tillage implement as claimed in claim 2, said frame including a hollow member provided with a pull-out drawer telescopically received therein, said drawer being sized to receive said blocks for storing the same during periods of non-use, said drawer having means for releasably holding the same in a fully retracted position within the member during operation of the implement.

7. A tillage implement comprising:

a frame;

ground wheels adjustably coupled with the frame in a manner to permit selective raising and lowering of the frame between working and transport positions;

hitch means coupled with the frame at the normally front end of the latter for connecting the implement to a towing vehicle to permit advancement of the implement;

a plurality of deep tillage shanks secured to the frame adjacent the rear of the latter for penetrating the soil at a depth substantially below ground level when the frame is in its working position and the implement is being advanced, the depth of said shanks below ground level being varied by adjusting the working position of the frame with the ground wheels;

at least a pair of gangs of coaxially aligned, concavo-convex discs mounted on the frame forwardly of the shanks for cutting through crop residue on the surface of the ground and mixing the residue into the topsoil to a depth substantially less than the depth of the shanks when the frame is in its working position and the implement is being advanced, each of said gangs including an elongated mounting beam from which the discs of the gang are suspended with their common axis of rotation extending parallel to the longitudinal axis of the beam, said beams obliquely outwardly from opposite sides of the central, fore-and-aft axis of the frame to face the concave surfaces of the discs forwardly at oblique angles with respect to the direction of travel of the implement;

angle adjustment means attaching the beams of said pair of gangs to the frame in a manner to permit selective adjustment of the oblique, angular relationship between the gangs and the fore-and-aft axis of the frame; and depth adjustment means operably associated with said gangs for permitting selective depth adjustment of the discs relative to the frame and the shanks of the implement, said angle adjustment means for each gang including an upright pivot between an inner end of the respective beam and the frame, permitting the gang to swing in a fore-and-aft direction during such angle adjustment, said angle adjustment means for each gang further including retainer means between the respective beam and the frame at a location laterally outboard of the pivot for releasably holding the gang in a selected angular position, said angle adjustment means for each gang including a pair of generally horizontally extending plates at respective inboard and outboard locations on the frame projecting laterally from and rigidly affixed to the frame in positions which provide overhead clearance above the plates, said pivot and said retaining means of each angle adjustment means comprising a pair of bolts having respective abutments disposed below the corresponding beam and respective shanks extending vertically through the beam and plates and projecting upwardly beyond the plates, said bolts each having a nut threadably received on the corresponding shank above the associated plate for cooperating with the latter in clamping the beam to the frame, said nut of each bolt being threadably adjustable along the shank of the bolt for selectively positioning the beam at variable speed distances below the frame, said depth adjustment means for each beam including a pair of rigid, selectively insertable and removable spacer blocks, one of said blocks being disposed for insertion between the beam and the plate adjacent the pivot bolt and the other of said blocks being disposed for insertion between the beam and the plate adjacent the retainer bolt, the nuts associated with the retainer bolt and the pivot bolt being disposed when threadably rotated on their respective bolts to clamp the spacer blocks between the beam and the plates for retaining the gang in a selected position of depth adjustment.

8. A tillage implement as claimed in claim 7, each of said blocks having a top adapted for abutting engagement with the frame and a bottom adapted for abutting engagement with the beam, said bottom of each block including a flat, recessed surface corresponding in width to the width of the beam and a pair of downwardly projecting ears at opposite extremities of said surface in disposition for causing the bottom of the block to nestingly receive the top portion of the beam when the block is placed thereon.

9. A tillage implement as claimed in claim 8, each of said blocks having a locating stud projecting downwardly from said recessed surface, each of said beams having holes in the top portions thereof adjacent said pivot and the retainer means for receiving the studs of the respective spacer blocks.

10. A tillage implement as claimed in claim 9, there being at least two pairs of said blocks for each gang, all of said blocks having their tops configured complementally to their bottoms whereby to permit the blocks to be selectively matingly stacked on top of one another for adjusting the spaced distance between the beams of the gangs and the frame, the top of each block having an opening for receiving the stud of a block matingly stacked thereon.

11. In a tillage implement having a frame and at least one earth-working tool assembly carried by the frame, said tool assembly including a generally horizontally extending beam and a plurality of earth-working tools mounted on the beam at spaced locations along the latter, the improvement comprising:

means attaching said assembly to the frame for vertical adjustment in a manner to increase or decrease the vertical dimension of a space between the beam and the frame; and rigid spacer structure positionable within the space between the beam and the frame for maintaining the selected adjusted position of the beam below the frame during tillage operations, said structure including a block, said block having a top adapted for abutting engagement with the frame and a bottom adapted for abutting engagement with the beam, said bottom of the block including a flat, recessed surface corresponding in width to the width of the beam and a pair of downwardly projecting ears at opposite extremities of said surface in disposition for causing the bottom of the block to nestingly receive the top portion of the beam when the block is placed thereon.

12. In a tillage implement as claimed in claim 11, said block having a locating stud projecting downwardly from said recessed surface, said beam having a hole in the top portion thereof for receiving the stud of the spacer block.

13. In a tillage implement as claimed in claim 12, there being at least a pair of said blocks, said pair of blocks being stackable on top of one another within said space, both of said blocks having their tops configured complementally to their bottoms whereby to permit the blocks to be selectively matingly stacked on top of one another for adjusting the spaced distance between the beam and the frame, the top of each block having an opening for receiving the stud of a block matingly stacked thereon.

14. In a tillage implement having a frame and at least one earth-working tool assembly carried by the frame, said tool assembly including a generally horizontally extending beam and a plurality of earth-working tools mounted on the beam at spaced locations along the latter, the improvement comprising:

means attaching said assembly to the frame for vertical adjustment in a manner to increase or decrease the vertical dimension of a space between the beam and the frame;

rigid spacer structure positionable within the space between the beam and the frame for maintaining the selected adjusted position of the beam below the frame during tillage operations; and angle adjustment means attaching the beam of said tool assembly to the frame in a manner to permit selective fore-and-aft angular adjustment of the tool assembly relative to the fore-and-aft axis of the frame.

15. In a tillage implement as claimed in claim 14, said angle adjustment means including an upright pivot between an inner end of the beam and the frame, permitting the tool assembly to swing in a fore-and-aft direction during such angle adjustment, said angle adjustment means further including retainer means between the beam and the frame at a location laterally outboard of the pivot for releasably holding the tool assembly in a selected angular position, said retainer means and said pivot being adjustable for selective vertical positioning of the beam below the frame.

16. In a tillage implement as claimed in claim 15, said angle adjustment means including a pair of generally horizontally extending plates at respective inboard and outboard locations on the frame projecting laterally from and rigidly affixed to the frame in positions which provide overhead clearance above the plates, said pivot and said retaining means of each angle adjustment means comprising a pair of bolts having respective abutments disposed below the beam and respective shanks extending vertically through the beam and plates and projecting upwardly beyond the plates, said bolts each having a nut threadably received on the corresponding shank above the associated plate for cooperating with the latter in clamping the beam to the frame.

17. In a tillage implement as claimed in claim 16, said nut of each bolt being threadably adjustable along the shank of the bolt for selectively positioning the beam at variable spaced distances below the frame, said spacer structure including a pair of rigid, selectively insertable and removable spacer blocks, one of said blocks being disposed for insertion between the beam and the plate adjacent the pivot bolt and the other of said blocks being disposed for insertion between the beam and the plate adjacent the retainer bolt, the nuts associated with the retainer bolt and the pivot bolt being disposed when threadably rotated on their respective bolts to clamp the spacer blocks between the beam and the plates for retaining the gang in a selected position of depth adjustment.

18. A tillage implement as claimed in claim 17, each of said blocks having a top adapted for abutting engagement with the respective plate and a bottom adapted for abutting engagement with the beam, said bottom of each block including a flat, recessed surface corresponding in width to the width of the beam and a pair of downwardly projecting gears at opposite extremities of said surface in disposition for causing the bottom of the block to nestingly receive the portion of the beam when the block is placed thereon.

* * * * *